United States Patent [19]

Fukuyoshi

[11] Patent Number: 5,045,418
[45] Date of Patent: Sep. 3, 1991

[54] ELECTRODE PLATE FOR DISPLAY DEVICE AND METHOD FOR PREPARATION THEREOF

[75] Inventor: Kenzo Fukuyoshi, Tamana, Japan

[73] Assignee: Toppan Printing Co., Ltd., Japan

[21] Appl. No.: 303,848

[22] Filed: Jan. 30, 1989

[30] Foreign Application Priority Data

Jan. 29, 1988 [JP] Japan .................................. 63-18959
Nov. 18, 1988 [JP] Japan ................................ 63-291672
Dec. 15, 1988 [JP] Japan ................................ 63-317942

[51] Int. Cl.$^5$ ................................................. G03F 9/00
[52] U.S. Cl. .......................................... 430/7; 430/20; 359/68; 359/87
[58] Field of Search ...................... 430/7, 20; 350/336, 350/339 F, 339 R

[56] References Cited

U.S. PATENT DOCUMENTS 4,744,637 5/1988 Sekimura et al. ................ 350/339 F
4,820,619 4/1989 Sandda et al. ......................... 430/7

FOREIGN PATENT DOCUMENTS 0226218 6/1987 European Pat. Off. .
50-80799 7/1975 Japan .
50-114926 9/1975 Japan .
52-46776 11/1977 Japan .
56-16432 4/1981 Japan .
61-43727 3/1986 Japan .
61-198131 9/1986 Japan .
61-233720 10/1986 Japan .
62-239125 10/1987 Japan .

OTHER PUBLICATIONS

Patent Abstracts of Japan, vol. 5, No. 157 (P-083), Oct. 8, 1981.
Patent Abstracts of Japan, vol. 11, No. 72 (P-554), Mar. 5, 1987.
Patent Abstracts of Japan, vol. 12, No. 203 (P-715), Nov. 6, 1988.
Patent Abstracts of Japan, vol. 9, No. 334 (P-417), Dec. 27, 1985.

Primary Examiner—Charles L. Bowers, Jr.
Assistant Examiner—J. Weddington
Attorney, Agent, or Firm—Ostrolenk, Faber, Gerb & Soffen

[57] ABSTRACT

An electrode plate for a display device is here disclosed which is characterized in that a protective material of elements constituting the electrode plate which is to be patterned comprises a novolak type epoxy resin into which a photosensitive group and a group to make the resin alkaline liquid-soluble are introduced. The protective material can be applied to a color filter coating layer on a color filter.

4 Claims, 2 Drawing Sheets

ELECTRODE PLATE FOR DISPLAY DEVICE AND METHOD FOR PREPARATION THEREOF

BACKGROUND OF THE INVENTION (1) Field of the Invention

The present invention relates to an electrode plate for display devices such as color liquid crystal display devices, input and output devices using liquid crystals, electroluminescence displays containing liquid crystals between transparent substrates and display drives using an electroluminescence material which become showable when voltage is applied thereto. Furthermore, the present invention also relates to a method for the preparation of the electrode plate for display devices.

(2) Description of the Prior Art

Recently, in high-density display devices such as liquid crystal display devices, there is a tendency such that the pitch of pixels or terminals decrease to a level as small as about 100 μm and simultaneously screens are scaled up. Therefore, it is necessary to lower the resistance of transparent electrodes and to decrease the thickness of the display devices, which requires the surface disposition of driving IC's. For the purpose of lowering the resistance of the electrodes, some techniques have been used. They are the technique of disposing, as an auxiliary conductor, a metallic conductor pattern having a width of several tens of micrometers on a part of each transparent electrode, and the technique of disposing a metallic conductor on the terminal of each substrate.

In an electrode plate for a display device, a substrate is coated with a color filter by means of a dyeing method, a printing method or an electrodeposition method, and the color filter is then covered all over with a transparent conductive layer, followed by etching to pattern the conductive layer, thereby forming transparent conductive electrodes. These techniques are known. In addition, in order to provide the color filter with acid resistance and to obtain the flat surface (e.g., unevenness on the surface = ±0.1 μm or less) of the color filter, a color filter coating layer can be formed on the transparent electrodes. Furthermore, transparent electrodes can be formed on the color filter coating layer, and a surface coating layer can be formed on the transparent electrodes. These techniques are also known. Moreover, in order to electrically connect with the transparent electrodes in the terminal portion of the electrode plate for the display device with high reliability, a known technique is used in which the coating layer on the terminal portion is patterned with an organic solvent so that the coating layer may be left only on the color filter. As described in Japanese Patent Laid-open Publication No. 233720/1986, the color filter coating layer of a peptide resin such as glue, casein or gelatin may be patterned on the color filter. Moreover, the color filter coating layer may be formed from acrylurethane acrylate resin which is different from the peptide resin, silicon, polyimide or the like, and this technique is also known.

As other examples of using the coating layer, there are the method in which the color filter coating layer on the color filter is patterned with an organic solvent in order to permit the surface disposition of IC's for the display device, and the flip-chip method in which plural IC pads are plated with a soft solder so that the thickness of the plate may be about several tens of micrometers, and they are soldered face downward directly on metallic conductors on the electrode plate for the display device. In this case, members which project from the surface of the substrate, i.e., the so-call solder dams are formed from polyimide around the metallic conductor patterns to prevent the solder from overflowing out of defined areas, whereby the metallic conductors are prevented from electrically shorting.

As materials for the color filter coating layer, a variety of resins can be used.

Japanese Patent Laid-open Publication No. 233720/1986 discloses the dyed coating layer of a polypeptide resin such as glue, casein or gelatin. However, this coating layer is poor in chemical resistance. For example, this dyed coating layer of gelatin commences to be attacked with a polyimide solution containing N-methylpyrrolidone in about one minute, a 2% aqueous alkaline solution in about 30 seconds, and a 20% hydrochloric acid in about one minute. Therefore, in the process in which a transparent conductive layer or an oriented film (polyimide or the like) on the color filter coating layer is patterned, the color filter coating layer is impaired with the developing solution containing an organic solvent such as N-methylpyrrolidone, so that productivity deteriorates. In addition, the disclosed color filter coating layer is also poor in humidity resistance, and for example, the coating layer commences to be decolored at 40° C. at a humidity of 90% in 100 hours, which lowers productivity. In particular, the color filter prepared by the dyeing method is liable to be easily decolored and discolored by a heat treatment after the formation of the transparent conductive layer, and the limit of its heat resistance is 180° C. which is unplactical. Furthermore, the flatness on the surface of the color filter is poor, about ±0.1 μm.

Acrylic resin and urethane acrylate resin have higher chemical resistance than gelatin. However, the limit of the heat resistance of these resins is 180° C. and therefore wrinkles, blisters and cracks easily occur under the influence of the subsequent heat treatment. In particular, the color filter prepared by the dyeing method is easily discolored and decolored by the heat treatment after the formation of the transparent conductive layer. Moreover, when the acrylic resin or the urethane acrylate resin is used, the flatness on the surface of the color filter is insufficient, about ±0.3 μm.

Silicone resin and polyimide resin are excellent in chemical resistance and heat resistance. However, when the usual silicone resin or polyimide resin is used, it is difficult to perform a patterning operation in accordance with a photolithography method. In addition, when the substrate is coated with such a heat-resistant resin all over, the resin layer is to be interposed between the transparent electrodes or the metallic conductors and an inorganic oxide layer or the substrate. Therefore, when pressure is applied from above, the transparent electrodes are easily damaged, electrical joint portions between the end of the electrode plate and pixels are cut, and even if not cut, resistance in the electrical joint portions heightens, so that the performance of the display deteriorates. Furthermore, when the silicone resin or the polyimide resin is used, the flatness on the surface of the color filter is as poor as about ±0.3 μm. The photosensitive polyimide which can be patterned by the photolithography method is extremely expensive, and its price in Japan is 180,000 yen per kilogram.

The surface coating layer and the solder dams have been formed from polyimide resin. However, the latter is extremely expensive as mentioned above, and in the case that the polyimide is patterned, it is necessary to employ solvent development or dry etching. In addition, when the solvent development is carried out by the use of the photosensitive polyimide, undeveloped portions are apt to be left on the surface of the substrate, and lead wires are easily cut when disposition is made in the terminal portion of the substrate, with the result that reliability is lost.

Since the above-mentioned electrode plate for the display device is prepared integrally, one defect has an influence on the whole of the electrode plate. Therefore, the greater the area of the electrode plate, the higher the probability of fault formation. This probability is proportional to the number of defective articles, and thus it is difficult to prepare the electrode plates for the display devices having large screens where the probability of the fault formation is high.

In view of the above-mentioned situations, materials for the color filter coating layer and the surface coating layer are demanded which are inexpensive, can be safely used in a development process, can protect layers from solvent used in the development process, and have a heat-resistant temperature of 220° C. or more, humidity resistance and chemical resistance. Furthermore, on the surface of the color filter, a flatness of ±0.15 to ±0.2 μm which is in the practical range is demanded, and particularly in the case that operation is performed under conditions of a high duty, maintaining high contrast and uniform display performance, as in STN liquid crystal devices and homeotropic liquid crystal devices, a flatness of ±0.1 μm or less is desired.

SUMMARY OF THE INVENTION

The present invention has been achieved to solve the above-mentioned problems, and an object of the present invention is to provide an electrode plate for a display device characterized in that a protective material of elements constituting the electrode plate which is to be patterned comprises a novolak type epoxy resin into which a photosensitive group and a group to make the resin alkaline liquid-soluble are introduced.

Another object of the present invention is to provide a method for the preparation of an electrode plate for a display device which comprises the step of patterning, by photolithography, a novolak type epoxy resin into which a photosensitive group and a group to make the resin alkaline liquid-soluble are introduced, and then polymerizing the patterned resin in order to form a protective material of elements constituting the electrode plate which is to be patterned.

The protective material can be applied to a color filter coating layer on a color filter.

DETAILED DESCRIPTION OF THE INVENTION

Figure 1:
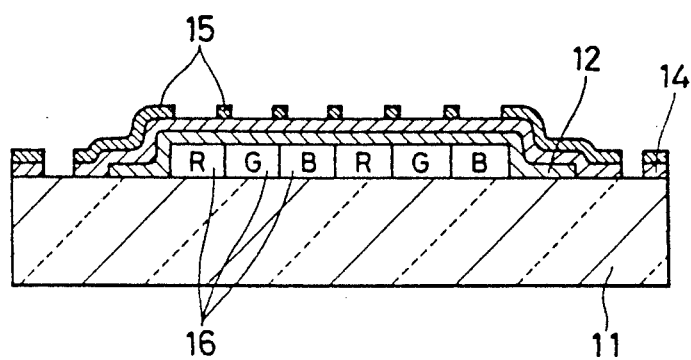
FIG. 1 is a schematical sectional view of an electrode plate for a display device according to the present invention.

According to the present invention, the above-mentioned conventional problems can be solved by making use of a novolak type epoxy resin having a photosensitive group and a group to make the resin alkali-soluble as a resin for the electrode plate in a display device which is to be patterned. In particular, when the novolak type epoxy resin is used for a color filter coating layer, the effect of the resin is remarkable.

As an auxiliary conductor for lowering the resistance of a transparent electrode, a metallic conductive layer pattern having a width of several tens of micrometers may be disposed on a part of the transparent electrode, and a metallic conductor may be also disposed on the terminal portion of a substrate to decrease the thickness of the high-density display device and to facilitate the attachment of members such as driving IC's.

Each of the color filter coating layer is not always a single layer, but in the case that it is composed of the single layer, the thickness of the color filter coating layer is preferably in the range of 0.02 to 5 μm. When the thickness of the layer is 0.02 μm or less, the layer cannot protect the color filter and other layers from the penetration of a detergent, i.e., an aqueous alkaline solution during the manufacture of the liquid crystal display devices and the penetration of an etching solution during the patterning step of the transparent conductive layer and the metallic conductive layer. Inversely when the thickness of the layer is 5 μm or more, light having a short wavelength of about 400 to 500 nm is gradually absorbed thereby inconveniently. Similarly in the case that the color filter coating layer is composed of plural layers, each layer preferably has the above-mentioned thickness, since the effect of the layer is great. However, if the slight coloring of the layer is accepted, the thickness of the layer may be 5 μm or more. When the color filter is present in the electrode plate, the surface of the color filter coating layer may be treated with a coupling agent with the intention of improving adhesive properties between the color filter and the color filter coating layer. Furthermore, for the purpose of flattening the surfaces of the color filter and the other layers, the layer of a peptide resin such as gelatin or casein, or the layer of polyvinyl alcohol may be disposed under each coating layer.

As a novolak type epoxy resin, both of a cresol novolak type epoxy resin and a phenol novolak type epoxy resin can be used in the present invention. This kind of novolak type epoxy resin is a photosensitive novolak type epoxy resin into which a carboxyl group is introduced by reacting with a dicarboxylic anhydride so as to become alkaline liquid-soluble and into which an acryloyl group is introduced so as to become photosensitive.

The color filter in the electrode plate of the present invention may be prepared from any of a pigment, a dyestuff and an ink by any of a photolithography method, a plating method and a printing method.

The layer comprising the novolak type epoxy resin having the photosensitive group and the group to make the resin alkaline liquid-soluble can be formed by first coating the electrode plate for the display device all over with the novolak type epoxy resin by means of spin coating, printing or transfer, and then patterning the coated film by a photolithography method (patterning exposure, and afterward development and removal).

The layer comprising the novolak type epoxy resin having the photosensitive group and the group to make the resin alkaline liquid-soluble is not always a single layer and may be composed of plural layers. These plural layers may be the layers all of which are made from the novolak type epoxy resin, or may be the combination of the layers of the novolak type epoxy resin and the layers of another resin such as another epoxy resin, acrylic resin, peptide resin, urethane resin, silicone resin, polyimide resin, melamine resin and polyvinyl alcohol. Furthermore, between the substrate and the layer thereon, there may be disposed a black matrix pattern or a metallic pattern as a detecting lead wire for coordinate input which is called a sense line. Driving IC's, diodes, resistor elements and condenser chips can be mounted on the electrode plate in an optional manner such as a soldering technique of using flip tips or utilizing a tape automated bonding step, or a technique of utilizing a wire bonding step or using an anisotropic conductive film or an organic resin film. The polymerization of the resin can be carried out at a temperature of 150 to 180° C. for a necessary period of time, for example, for a period of 10 minutes to 1 hour.

Examples of the polypeptide resin include casein, glue and gelatin. In the case that a photolithography technique is used to perform patterning, ammonium dichromate or the like is added to the polypeptide resin so as to become photosensitive, and the polypeptide resin is then subjected to coating, drying, exposure, development and film-hardening treatment in order to form the desired layer.

The transparent electrodes are required to be transparent and conductive. The transparent electrodes may be prepared by patterning oxides of indium and tin which is called ITO, an oxide of tin, a mixed oxide of tin and antimony or the like through a means such as etching.

The metallic conductors are used with the intention of compensating the low conductivity of the transparent electrodes in the section other than pixel portions which need not be transparent, with the intention of heightening adhesive properties to a solder in a soldering portion in the case that surface disposition is carried out, and with the intention of utilizing itself as a light shield film. Materials for the metallic conductors are required to have good conductivity and to be excellent in wet properties to the solder. Examples of these materials include nickel, gold, silver, copper, tin, solder and alloys thereof. Thus, the material for the metallic electrodes can be suitably selected from these examples in compliance with the use application, and it may be used in an optional form such as a multi-layer structure considering high adhesive strength to a lower film and release of stress. In addition, the thickness of the metallic electrodes may be decided in accordance with the purpose or place where these electrodes are disposed. The metallic electrodes may be prepared in an optional manner such as vapor deposition, sputtering, plating, printing or transfer. However, in the case of the vapor deposition, the usual thickness of the metallic electrodes is in the range of several hundreds of angstroms to several micrometers, and in the case of the plating, the usual thickness thereof is in the range of 0.1 to 10 $\mu$m. When metallic electrodes having greater thickness than the above-indicated upper limit are required, the printing or the transfer technique can be employed, but they are not limited thereto.

The color filter layer is preferably patterned by photolithography or printing, since positions for electrical connection terminals are exposed. Advantageously, the surface coating layer is made from an organic material or an organometallic compound such as an alkoxide. However, as the other material for the surface coating layer, an oxide such as $SiO_2$, $ZrO_2$ or $PbO$ may be used, and as the formation technique, sputtering or vapor deposition may be employed in which a metal mask is used.

For the purpose of preventing the orientation turbulence of a display drive such as liquid crystals with time and the degradation of the display device, the layer of an inorganic oxide such as $ZrO_2$, $PbO$ or $SiO_2$ may be formed in a thickness of 0.01 to 1 $\mu$m on the transparent electrodes or an effective display surface.

The novolak type epoxy resin has a three-dimensional structure, and when it is polymerized sufficiently, the resin is provided with heat resistance which can withstand about 250° C. Therefore, wrinkles, cracks and discoloration scarcely take place in the subsequent process. In addition, the layer comprising the sufficiently polymerized novolak type epoxy resin has chemical resistance which withstands a 2% aqueous alkaline solution for 30 minutes and a 20% hydrochloric acid for 30 minutes. Furthermore, the novolak type epoxy resin layer also has humidity resistance, and therefore the color filter can be protected from decoloration and discoloration under conditions of 40° C. and a humidity of 90% for 500 hours or more.

The novolak type epoxy resin having the alkaline liquid-solubility and the photosensitivity can be easily provided with photosensitivity and solubility in an alkali as described above, and thus it can be developed and removed with various aqueous alkaline solutions. Therefore, removal portions of the resin can be disposed in optical positions. As is apparent, the developing solution for the resin is water-soluble, and hence there is no danger of explosion and firing in contrast to an organic solvent developing solution. Operative sections of the transparent electrodes and the metallic conductors as well as lead wires are easily covered with the novolak type epoxy resin having alkaline liquid-solubility and the photosensitivity except the portions which should be exposed, so that they are protected effectively, with the result that the reliability of the display devices can be enhanced.

The price of the novolak type epoxy resin in Japan is estimated to be about 10,000 yen per kilogram, which is inexpensive.

Particularly in the case that the color filter coating layer is composed of two layers one of which is made from the novolak type epoxy resin and the other of which is made from the polypeptide resin, the flatness on the surface of the color filter is good, ±0.08 to ±0.05 $\mu$m. That is, the flattening effect of the two-layer structure comprising the different resins is about double. In addition, the main component of the first resin is the same as that of the color filter, and thus its adhesive strength to the color filter is also high, so that the occurrence of wrinkles and blisters can be inhibited.

EXAMPLE 1

FIG. 1 is a schematical sectional view of an electrode plate for a liquid crystal display device of the present invention. On a transparent substrate 11 which is a blue float glass having a thickness of 1 mm, a color filter 16 having a thickness of about 1.8 $\mu$m and containing green (G), red (R) and blue (B) was formed by a relief dyeing method. The color filter 16 was then coated with a phenolic novolak epoxy resin having an acryloyl group and a carboxyl group so that the thickness of the dried resin layer might be about 1 μm. The phenolic novolak epoxy resin was then exposed to ultraviolet rays, and unexposed portions of the resin were developed and removed with a 1% aqueous sodium carbonate solution, followed by heating and polymerizing at a temperature of 150° to 180° C., whereby a protective layer 12 was obtained which was patterned in a rectangular shape so as to cover the whole surface of the color filter. Afterward, a transparent conductive layer 14 having a thickness of 0.08 μm was formed using a material called ITO on the protective layer 12 by an ion plating method, and a metallic conductive layer 15 comprising a chromium layer of 0.08 μm, an aluminum layer of 0.14 μm and a nickel layer of 0.08 μm was then formed on the transparent electrodes 14 by vapor deposition. Next, the nickel layer, the aluminum layer, the chromium layer and the ITO layer were successively patterned by wet etching, thereby obtaining an electrode plate for a color liquid crystal display device as shown in FIG. 1.

EXAMPLE 2

Figure 2:
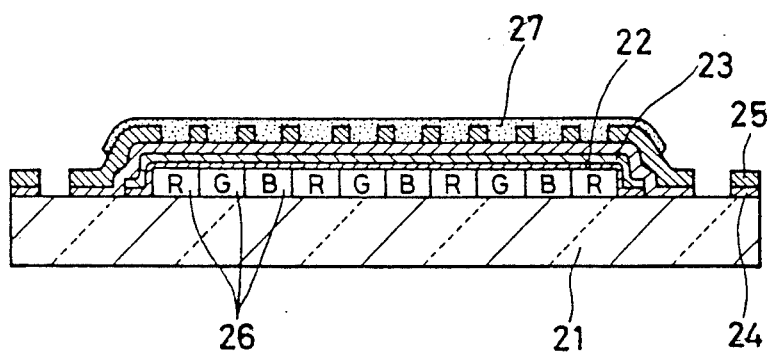
FIG. 2 is a schematical sectional view of another embodiment of the electrode plate for the display device according to the present invention.

FIG. 2 is a schematic sectional view of another embodiment of an electrode plate for a liquid crystal display device according to the present invention. On a transparent substrate 11 which is a float glass having a thickness of 1 mm, there were formed a color filter 26 having a thickness of about 1.8 μm and containing green (G), red (R) and blue (B) by a relief dyeing method, a color filter coating layer comprising two layers one of which was a gelatin layer 22 having a thickness of 0.9 μm and the other of which was a phenolic novolak type epoxy resin layer 23 having a thickness of 0.8 μm and having an acryloyl group and a carboxyl group, an ITO transparent conductive layer 24 having a thickness of 0.14 μm, and a metallic conductive layer 25 comprising three layers which were a chromium layer of 0.02 μm, an aluminum layer of 0.15 μm and chromium layer of 0.04 μm, in this order. On the transparent conductive layer 24, a surface coating layer 27 of a phenolic novolak type epoxy resin having a thickness of 0.1 μm was formed so as to substantially cover all of the color filter 26.

Next, the transparent conductive layer and the metallic conductive layer were selectively patterned by wet-etching the chromium layer, the aluminum layer, the chromium layer and the ITO layer successively in order to prepare transparent electrodes and metallic conductors. Furthermore, the color filter coating layer and the surface coating layer were both prepared by application, drying, exposure, development, polymerization and patterning of the phenolic novolak type epoxy resin into which the acryloyl group and the carboxyl group were introduced so as to become photosensitive.

EXAMPLE 3

Figure 3:
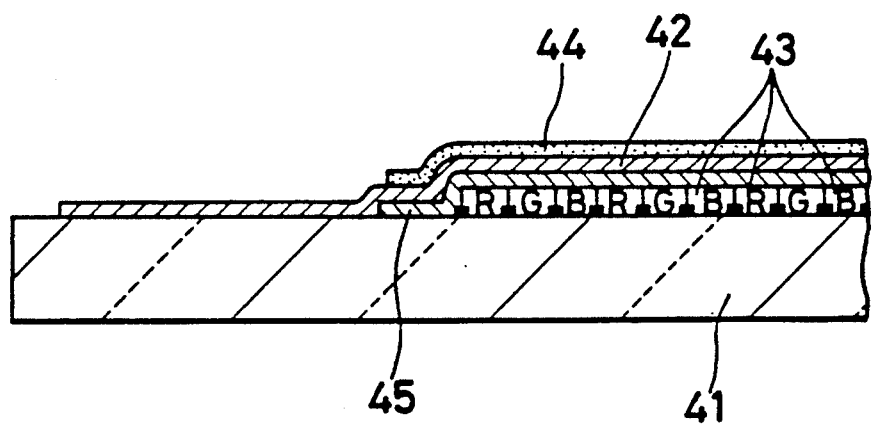
FIG. 3 is a schematical sectional view of a further embodiment of the electrode plate for the display device according to the present invention.

FIG. 3 is a schematic sectional view of a further embodiment of an electrode plate for a liquid crystal display device according to the present invention. On a glass substrate 41, there were formed a color filter 43 having a thickness of 1.8 μm by a dyeing method, a color filter coating layer 45 comprising epoxy resin and having a thickness of 0.9 μm, an ITO transparent conductive layer 42 having a thickness of 0.24 μm and a surface coating layer 44 comprising a phenolic novolak type epoxy resin having a thickness of 0.1 μm and having an acryloyl group and a carboxyl group. The surface coating layer 44 was disposed only on an effective display surface, and the function of the layer 44 was to improve orientation characteristics of liquid crystals.

The color filter 43 was composed of four colors of black (BLK), green (G), red (R) and blue (B), and they were formed by a relief dyeing method. The surface coating layer 44 was formed by applying a photosensitive liquid having a viscosity of 4 centipoise and comprising a phenolic novolak type epoxy resin having an acryloyl group and a carboxyl group onto the transparent conductive layer 42 so as to cover the color filter coating layer 45 and the transparent conductive layer 42. After drying, predetermined portions were selectively exposed to ultraviolet rays in order to insolubilize the portions, and the unexposed portions were then developed and removed. Afterward, the layer was polymerized by heating, thereby forming the desired surface coating layer.

As discussed above, as a member consisting the electrode plate for each display device of the present invention, the polymer of a novolak type epoxy resin having a photosensitive group and a group to make the resin alkaline liquid-soluble is used, and therefore the following effects can be obtained.

Predetermined portions of the color filter coating layer comprising the novolak type epoxy resin can be removed by development. In consequence, lead wires (e.g., print circuit or the like) can be soldered to the exposed transparent electrodes on the substrate, which enables reliable electrical connection. The operative portions of the transparent electrodes and the metallic conductors as well as the lead wires can be covered with the polymer of the novolak type epoxy resin, and thus they can be protected from an oriented film and the like.

Since the novolak type epoxy resin is used, the retention period of humidity resistance is extended twice or more and the retention period of chemical resistance is also extended 2 to 60 times as compared with the case where a polypeptide resin is used. For this reason, the color filter can be protected from organic solvent during the patterning step of the transparent conductive layer and the oriented film, which can improve the reliability of the liquid crystal display devices remarkably. Furthermore, the color filter coating layer which comprise the novolak epoxy resin can be formed so as to cover the color filter, the transparent electrodes and the metallic conductors, and hence they can be protected, which can also improve the reliability noticeably. Thus, since the quality of the color filter and the like is maintained as described above, the performance of the liquid crystal display devices can be improved. Moreover, the developing solution used in the present invention is aqueous, and hence work can be carried out in safe environment without explosion and firing.

In particular, when the thickness of each film is in the range of 0.02 to 5 μm, the reliability can be further improved, and the absorption of light can be inhibited. Since the novolak epoxy resin has heat resistance, no wrinkles occur and the color filter is not decolored during a heat treatment at 250° C.

The price of the novolak epoxy resin is 1/10 or less of that of photosensitive polyimide resin, and the electrode plate for the display device can be supplied in low cost.

In the case that the color filter comprises the polypeptide resin and the color filter coating layer is composed of two layers one of which is made from the polymerized novolak type epoxy resin and the other of which is made from the polypeptide resin, a high flatness of ±0.08 to ±0.05 μm can be obtained.

What is claimed is:

1. A protected electrode plate for a display device comprising elements constituting said electrode plate and a protective material for elements constituting said electrode plate which is to be patterned comprising a novolak epoxy resin into which a photosensitive group and a group to make said resin alkaline liquid-soluble were introduced and wherein said protected electrode plate is applied to a color filter coating layer on said elements.

2. The electrode plate for a display device according to claim 1 wherein the thickness of said color filter coating layer is in the range of 0.02 to 5 μm.

3. The electrode plate for a display device according to claim 1 wherein said color filter coating layers are composed of a color filter coating layer comprising a novolak epoxy resin into which a photosensitive group and a group to make said resin alkaline liquid-soluble were introduced and a color filter coating layer comprising a polypeptide resin, and said color filter comprises said polypeptide resin.

4. The electrode plate for a display device according to claim 3 wherein said color filter comprises said polypeptide resin, the thickness of said color filter coating layer comprising said polypeptide resin is in the range of 0.02 to 5 μm, and the thickness of said color filter coating layer comprising said novolak epoxy resin in the range of 0.02 to 5 μm.

* * * * *